United States Patent [19]  [11]  4,287,034
Pieslak et al. [45] Sep. 1, 1981

[54] PROTECTING METAL SUBSTRATES FROM CORROSION

[75] Inventors: George Pieslak, Alameda; Kathleen A. Erbes-Mrsny; Elena C. Fritchle, both of San Bruno, all of Calif.

[73] Assignee: Raychem Corporation, Menlo Park, Calif.

[21] Appl. No.: 92,852

[22] Filed: Nov. 9, 1979

[51] Int. Cl.$^3$ .................. C23F 13/00; D03D 49/24; C08L 1/00; C08K 5/05

[52] U.S. Cl. ..................... 204/147; 138/145; 138/146; 138/DIG. 1; 138/DIG. 6; 174/DIG. 8; 204/196; 428/36; 260/17.4 SG; 260/33.4 PQ; 525/57

[58] Field of Search ............. 525/57; 260/17.4 SG, 260/33.4 PQ; 174/DIG. 8, 110 PM; 138/143, 145, 146, DIG. 6, DIG. 1; 204/290 R, 291, 147, 148, 196, 197; 428/36

[56] References Cited

U.S. PATENT DOCUMENTS

| 3,382,121 | 5/1968 | Sherlock | 174/DIG. 8 |
|---|---|---|---|
| 3,432,464 | 3/1969 | Fitko et al. | |
| 3,474,055 | 10/1969 | Dooley | 260/17.4 SG |
| 3,539,411 | 11/1970 | Heslop et al. | 174/DIG. 8 |
| 3,554,999 | 1/1971 | Shaw et al. | 174/DIG. 8 |
| 3,578,615 | 5/1971 | Moore et al. | |
| 3,582,457 | 6/1971 | Barthell | 174/DIG. 8 |
| 3,652,712 | 3/1972 | Ahmed et al. | |
| 3,669,824 | 6/1972 | Hess | 174/DIG. 8 |
| 3,681,515 | 8/1972 | Mildner | 174/110 PM |
| 3,691,120 | 9/1972 | Susuki et al. | 260/42.46 |
| 3,705,207 | 12/1972 | Sills | |
| 3,853,797 | 12/1974 | Pelzig | 260/17.4 SG |
| 3,868,313 | 2/1975 | Gay | 204/147 |
| 3,877,490 | 4/1975 | Tsubouchi et al. | 138/DIG. 6 |
| 3,897,583 | 7/1975 | Bellamy | |
| 3,957,382 | 5/1976 | Grevel, Jr. et al. | 174/DIG. 8 |
| 4,091,134 | 5/1978 | Uemura et al. | 138/145 |
| 4,144,113 | 3/1979 | Mori et al. | |

Primary Examiner—William R. Dixon, Jr.
Attorney, Agent, or Firm—Lyon & Lyon

[57] ABSTRACT

A protective coating adhered to the surface of a metal substrate such as a pipe using an adhesive composition containing an adhesive component and a polyhydroxy compound protects the substrate from corrosion. The adhesive has improved resistance to cathodic disbonding which generally weakens the adhesive bond between the protective coating and the substrate when a current is impressed through the substrate causing it to function as a cathode. The electric current inhibits loss of metal ions from the substrate to the environment thus reducing corrosion of the substrate.

72 Claims, No Drawings

PROTECTING METAL SUBSTRATES FROM CORROSION

BACKGROUND OF THE INVENTION

1. Field of the Invention

This invention relates to protecting pipes from corrosion and to novel adhesive compositions having improved adhesive properties, in particular improved resistance to cathodic disbonding.

To protect steel, or other metal, pipes and pipelines from corrosion, a protective coating is generally applied. The protective coating can be, for example, a polymeric sheet, tape or sleeve of, for example polyethylene, bonded to the surface of the pipe. Various adhesives and mastics can be used to bond the coating to the pipe. However, accidental perforations in the coating often result during installation and use of the pipe or pipeline and expose areas of the pipe to the environment.

Corrosion of a steel or iron pipe when exposed to the environment is due to electrochemical reactions in which the pipe loses iron ions to water in the environment and a localized anodic region is created on the pipe. To prevent the development of these anodic regions and the attendant corrosion of the pipe, an electric current can be imposed along the length of the pipe. The pipe is connected to a negative electrical potential, thus causing the pipe to act as a cathode. In this way, further loss of iron ions is prevented. It is known that adhesive compositions generally used to bond a protective coating to a pipe are adversely affected by this imposed electrical current. The result of this is a weakening of the adhesive bond between the coating and the steel pipe causing the coating to separate from the pipe exposing more of the surface of the pipe to the corrosive conditions in the environment. This phenomenon is referred to in the art as "cathodic disbonding".

SUMMARY OF THE INVENTION

This invention provides a heat shrinkable article, such as a sheet, a tape or a sleeve, coated on at least a portion of the surface thereof with an adhesive composition comprising an adhesive component and a polyhydroxy compound. When the article is bonded to a metal substrate the adhesive bond between the substrate and the article is resistant to cathodic disbondment when a negative potential is applied to the substrate. Some of the adhesive compositions utilized in accordance with this invention are novel. Accordingly this invention also comprises an adhesive composition comprising an ethylene copolymer based hot melt adhesive and from about 0.01 to about 30% by weight, based on the total weight of the adhesive composition, of a polyhydroxy compound.

DETAILED DESCRIPTION OF THE INVENTION

The heat shrinkable article of this invention can be, for example, a sheet, tape or sleeve coated on at least a portion of one surface thereof with an adhesive composition, as defined more fully below.

When in the form of a sheet or tape, the article is generally coated on over one entire surface. The sheet or tape is placed on the substrate to be protected with the adhesive coated surface placed in contact with the substrate and then heated to bond the article to the substrate. The substrate can be any metal substrate sought to be protected from corrosion but in practice the substrate is usually a metal pipe and in particular an iron or steel pipe. The sheet or tape is wrapped around the pipe and heated to heat shrink the sheet or tape into the pipe and bond it to the pipe with the adhesive.

When the heat shrinkable article is in the form of a sleeve it is coated with adhesive on the interior surface thereof. The sleeve can be a tube of continuous circumference or a tube which is longitudinally split. The tube is positioned around the pipe and heated to shrink the sleeve onto the pipe and melt the adhesive to bond the sleeve to the pipe. If a longitudinally split sleeve is used, the longitudinal edges must be held together in some manner, usually with a channel, during the heat shrinking step.

The protective coating or covering applied to the metal substrate can be a heat shrinkable article as above or a sheet, tape or tube or non-heat shrinkable material coated with the adhesive. The protective coating is preferably a polyolefin such as polyethylene or polypropylene. Other polymers such as polyvinyl chloride and polymeric blends can also be used. Particularly preferred is cross-linked polyethylene.

In some embodiments of the invention the adhesive composition is applied to the metal substrate prior to applying the protective coating.

The adhesive component can be any adhesive typically used to bond corrosion protection coatings to metal pipes or other substrates, and particularly those generally used to bond a coating to a pipeline which will carry an impressed current to protect the pipeline from corrosion. Such adhesives include hot melt adhesives such as those based on thermoplastic polyamides, polyolefins, polyesters, polyurethanes, polysulfides and the like. Particularly preferred are hot melt adhesives containing ethylene copolymers, for example copolymers of ethylene with vinyl acetate, maleic anhydride, acrylic acid, methacrylic acid or an alkyl acrylate such as ethyl acrylate. Mastics can also be used, for example low molecular weight polyisobutylene based mastic compositions.

The adhesive composition also contains the usual additives such as tackifiers, fillers, waxes, rubbers and stabilizers. Tackifiers that are used include phenolformaldehyde resins, hydrocarbon resins, vinyl toluene-alphamethyl styrene copolymers, polyterpenes and phenol-terpene resins. Other tackifiers that can be included are well known. Fillers that can be used include pigments and reinforcing agents such as carbon black.

Waxes which are usually added to hot melt adhesives are crystalline waxes, such as, low molecular weight polyethylene, ethylene-vinyl acetate copolymer wax, ethylene-acrylic acid copolymer wax ethylene-maleic anhydride copolymer wax, atactic polypropylene, and the like. Rubber which can be used are natural and synthetic rubbers, particularly ethylene-propylene rubbers and ethylene-propylene-diene rubbers. Stabilizers which can be used include antioxidants, such as phenolic antioxidants, hindered amine antioxidants, and the like.

The polyhydroxy compound utilized in accordance with this invention preferably is an aliphatic polyhydroxy compound in which hydroxyl groups are bonded to at least about 50%, preferably at least 60% and especially at least 75% of the aliphatic carbon atoms.

Polyhydroxy compounds which can be used include, for example, monosaccharides, polysaccharides, hydroxyl group containing synthetic polymers and polyhydric alcohols.

Polysaccharides that can be used include starches and cellulose and derivatives thereof, such as, amylose, amylopectin, cellolose acetate, cellulose nitrate, hydroxyethyl cellulose, ethyl hydroxyethyl cellulose, hydroxypropyl cellulose, and the like. Monosaccharides which can be used include fructose, mannose, maltose, sucrose, glucose, ribose, raffinose, mannitol, sorbitol and similar sugars. Derivatives such as lower alkyl derivatives of the monosaccharides and mixtures of monosaccharides can be used. Hydroxyl group containing polymers which can be used include polyvinyl alcohol, and various hydrolyzed polymers containing aliphatic carbon atoms with hydroxyl groups on at least 50% of the carbon atoms. Aliphatic polyhydric alcohols include, glycol, glycerol, pentaerythritol and the like.

The polyhydroxy compound improves the adhesion properties, particularly the resistance to cathodic disbonding, of various adhesives and mastics used with metals in corrosion protection applications. The amount of polyhydroxy compound added to improve the resistance to cathodic disbonding characteristics of the adhesive ranges from about 0.01% to about 30%, preferably from about 0.1% to about 10% and especially from about 0.1% to about 5%, by weight based on the total weight of the adhesive composition.

The polyhydroxy compound can be blended with the adhesive component to form a homogeneous adhesive composition by conventional methods. Such methods include use of a two roll mill, a Banbury mixer or a Brabender mixer. Temperatures during the mixing or blending procedure should be from about 150° to about 300° F., preferably from about 250° to about 300° F. When possible, it is preferred to blend the components at a temperature above the melting point of the polyhydroxy compound to ensure uniform dispersion of the polyhydroxy compound in the adhesive composition.

The heat shrinkable articles and adhesive compositions of this invention can be used for other purposes besides protection of metal substrates. The presence of the polyhydroxy compound in the adhesive compositions improves the adhesion properties with various substrates, including other metals, as well as steel and iron, and polymeric substrates such as articles of polyethylene, polypropylene, polyvinyl chloride and the like. In the pipe protection context it has been found that a patch of polymeric sheet material coated with the adhesive composition can be used to repair damage to the protective coating on the pipe. The resulting bond between the patch and the covering is stronger than the bond formed between such materials if an adhesive composition without the polyhydroxy compound is used.

The following examples illustrate the invention. In these examples adhesive compositions were prepared containing an adhesive component and a polyhydroxy compound. The adhesives were tested for resistance to cathodic disbondment by using the adhesive to bond a heat shrinkable sleeve of polyethylene to a steel pipe. The polyethylene coated pipe was then tested by the method of ASTM G-42-75 to determine the resistance of the adhesive to cathodic disbondment.

EXAMPLES 1-6

Adhesive compositions were prepared by thoroughly mixing the ingredients in a two-mill roll at a mixing temperature of 250°-300° F.

An adhesive component was prepared by blending 45 parts of an ethylene-ethyl acrylate copolymer containing 18% ethyl acrylate, 31.5 parts of an ethylene-acrylic acid copolymer wax having an acid number of 40, 5 parts of a phenol-formaldehyde resin tackifier, 8 parts of an ethylene-propylene-1, 4-hexadiene terpolymer rubber, 10 parts of carbon black and 0.5 parts of 1,2-dihydro-2,2 4-trimethyl quinoline. To the adhesive component was added a polyhydroxy compound as designated below for each example:

| Example | Amount | Polyhydroxy Compound |
|---------|--------|---------------------|
| 1 | — | None |
| 2 | 10 parts | Polyvinyl alcohol |
| 3 | 10 parts | Anhydrous glucose |
| 4 | 10 parts | Pentarythritol |
| 5 | 2 parts | Mannitol |
| 6 | 5 parts | Sorbitol |

The adhesive compositions were tested for their resistance to cathodic disbondment by following text procedure. The results are shown in the Table.

CATHODIC DISBONDING TEST PROCEDURE

The cathodic disbonding resistance of an adhesive can be tested by the test method found in ASTM G-42-75, method A.

The adhesive composition to be tested was pressed into slabs, 6"×6"×0.025", in a hot press between two "Teflon", polytetrafluoroethylene, coated plates.

The surface of a steel pipe, 12 inches long and 2 inches in diameter was grit blasted and degreased with solvent and preheated to 250°-350° F. with a torch. The sample adhesive slab, trimmed to 6"×4"×0.025", was placed on the preheated pipe and a heat shrinkable sleeve of cross-linked polyethylene was placed over it and heated to shrink the sleeve over the adhesive and pipe. One end of the pipe was then sealed with a heat shrinkable cap.

A hole (holiday) is drilled through the polyethylene coating and adhesive in the middle of the length of pipe to expose the metal surface of the pipe at that point. The pipe was then immersed in an electrolyte solution comprising water and one weight percent of each of sodium chloride, sodium sulfate, and sodium carbonate. A potential of −1.5 volts is applied to the pipe thus making the pipe a cathode in the electrolyte solution which also contains a sacrificial anode. The sample and electrolyte solution were maintained at a temperature of 80° C. for five days. The pipe was then removed and the area around the holiday inspected to determine the extent of disbondment, i.e., the area over which the adhesive bond between the polyethylene coating and the pipe was weakened permitting the polyethylene coating and adhesive to be peeled away. The approximate radius of the disbondment area was measured in millimeters (mm) and recorded.

EXAMPLE 7

An adhesive composition containing the following ingredients was prepared and tested as in Examples 1-6. This adhesive composition contained 45 parts of an ethylene-ethyl acrylate copolymer containing 18% ethyl acrylate, 32 parts of polyethylene microcrystalline wax, 5 parts of phenol-formaldehyde resin tackifier, 8 parts of ethylene-propylene-1, 4-hexadiene terpolymer rubber, 8 parts of carbon black and 1 part of 1,2-dihydro-2,2 4-trimethyl quinoline and 5 parts of anhydrous glucose. The results are given in the Table.

EXAMPLE 8

An adhesive containing the following ingredients was prepared and tested as in Examples 1-6. This adhesive contained 35 parts of an ethylene-ethyl acrylate copolymer containing 18% ethyl acrylate, 25 parts of a low molecular weight thermoplastic polyamide resin, 25 parts of an ethylene-maleic anhydride copolymer wax having an acid number of 16, 10 parts of an ethylene-propylene-1, 4-hexadiene terpolymer rubber, 2 parts of carbon black and 2 parts of 1,2-dihydro-2,2,4-trimethyl quinoline.

EXAMPLE 9

To the adhesive prepared in Example 8, 10 parts of polyvinyl alcohol was added and incorporated into the adhesive. The adhesives of Examples 8 and 9 were tested as above. The results are shown in the Table.

TABLE

| Ex. | Polyhydroxy Compound | Amount of Polyhydroxy Compound (Parts) | Cathodic Disbonding Radius |
|---|---|---|---|
| 1 | None | — | Complete Disbonding |
| 2 | Polyvinyl alcohol | 10 | 9 mm |
| 3 | Glucose | 10 | 7 mm |
| 4 | Pentarythritol | 10 | 7 mm |
| 5 | Mannitol | 2 | 10 mm |
| 6 | Sorbitol | 5 | 5 mm |
| 7* | Glucose | 5 | 8 mm |
| 8 | None | — | Complete Disbonding |
| 9 | Polyvinyl alcohol | 10 | 16 mm |

*This adhesive was also tested as above but at 95° C. The cathodic disbonding radius was 15 mm.

We claim:

1. An article of a heat shrinkable material having coated on at least a part of the surface thereof an adhesive composition comprising an adhesive component and an aliphatic polyhydroxy compound in which hydroxyl groups are bonded to at least 50 percent of the aliphatic carbon atoms in an amount sufficient to impart improved resistance to cathodic disbondment to the adhesive composition, said adhesive component being a hot melt adhesive or a mastic.

2. An article in accordance with claim 1 wherein said article is a sheet.

3. An article in accordance with claim 1 wherein said article is a tape.

4. An article in accordance with claim 1 wherein said article is a sleeve.

5. An article in accordance with claim 1 wherein said heat shrinkable material is a polymeric material.

6. An article in accordance with claim 5 wherein said polymeric material is polyethylene.

7. An article in accordance with claim 5 wherein said polymeric material is cross-linked polyethylene.

8. An article in accordance with claim 1 wherein said adhesive component is a hot melt adhesive.

9. An article in accordance with claim 8 wherein said hot melt adhesive comprises an ethylene-ethyl acrylate copolymer hot melt adhesive.

10. An article in accordance with claim 8 wherein said hot melt adhesive comprises an ethylene-vinyl acetate copolymer hot melt adhesive.

11. An article in accordance with claim 1 wherein said polyhydroxy compound is glucose.

12. An article in accordance with claim 1 wherein said polyhydroxy compound is sorbitol.

13. An article in accordance with claim 1 wherein said polyhydroxy compound is mannitol.

14. An article in accordance with claim 1 wherein said polyhydroxy compound is polyvinyl alcohol.

15. An article in accordance with claim 1 wherein said polyhydroxy compound is pentaerythritol.

16. A pipe having bonded to the surface thereof a polymeric coating, said coating being bonded to said pipe with an adhesive composition comprising an adhesive component and from about 0.01 to about 30 percent by weight, based on the total weight of the adhesive composition, of an aliphatic polyhydroxy compound in which hydroxyl groups are bonded to at least 50 percent of the aliphatic carbon atoms, said adhesive component being a hot melt adhesive or a mastic.

17. A pipe in accordance with claim 16 wherein said pipe is of steel.

18. A pipe in accordance with claim 16 wherein said polymeric coating is polyethylene.

19. A pipe in accordance with claim 18 wherein said polymeric coating is cross-linked polyethylene.

20. A pipe in accordance with claim 16 wherein said adhesive component is a hot melt adhesive.

21. A pipe in accordance with claim 20 wherein said hot melt adhesive is an ethylene-ethyl acrylate copolymer hot melt adhesive.

22. A pipe in accordance with claim 20 wherein said hot melt adhesive comprises an ethylene-vinyl acetate copolymer hot melt adhesive.

23. A pipe in accordance with claim 16 wherein said polyhydroxy compound is glucose.

24. A pipe in accordance with claim 16 wherein said polyhydroxy compound is sorbitol.

25. A pipe in accordance with claim 16 wherein said polyhydroxy compound is mannitol.

26. A pipe in accordance with claim 16 wherein said polyhydroxy compound is polyvinyl alcohol.

27. A pipe in accordance with claim 16 wherein said polyhydroxy compound is pentacrythritol.

28. A metal pipe which is connected in an electric circuit such that said pipe forms a cathode; said pipe having bonded to the surface thereof a polymeric coating with an intermediate layer of an adhesive comprising an adhesive component and from about 0.01 to about 30 percent by weight, based on the total weight of the composition of an aliphatic polyhydroxy compound in which hydroxyl groups are bonded to at least 50 percent of the carbon atoms, said adhesive component being a hot melt adhesive or a mastic.

29. A pipe in accordance with claim 28 wherein said pipe is of steel.

30. A pipe in accordance with claim 28 wherein said polymeric coating is polyethylene.

31. A pipe in accordance with claim 30 wherein said polymeric coating is cross-linked polyethylene.

32. A pipe in accordance with claim 28 wherein said adhesive component is a hot melt adhesive.

33. A pipe in accordance with claim 32 wherein said hot melt adhesive is an ethylene-ethyl acrylate copolymer hot melt adhesive.

34. A pipe in accordance with claim 32 wherein said hot melt adhesive comprises an ethylene-vinyl acetate copolymer hot melt adhesive.

35. A pipe in accordance with claim 28 wherein said polyhydroxy compound is glucose.

36. A pipe in accordance with claim 28 wherein said polyhydroxy compound is sorbitol.

37. A pipe in accordance with claim 28 wherein said polyhydroxy compound is mannitol.

38. A pipe in accordance with claim 28 wherein said polyhydroxy compound is polyvinyl alcohol.

39. A pipe in accordance with claim 28 wherein said polyhydroxy compound is pentaerythritol.

40. An adhesive composition comprising an ethylene-ethyl acrylate copolymer hot melt adhesive and from about 0.01 to about 30 percent by weight, based on the total weight of the adhesive composition, of an aliphatic polyhydroxy compound in which hydroxyl groups are bonded to at least 50 percent of the aliphatic carbon atoms.

41. An adhesive composition in accordance with claim 40 wherein said polyhydroxy compound is glucose.

42. An adhesive composition in accordance with claim 40 wherein said polyhydroxy compound is sorbitol.

43. An adhesive composition in accordance with claim 40 wherein said polyhydroxy compound is mannitol.

44. An adhesive composition in accordance with claim 40 wherein said polyhydroxy compound is polyvinyl alcohol.

45. An adhesive composition in accordance with claim 40 wherein said polyhydroxy compound is pentaerythritol.

46. An adhesive composition comprising an ethylene-vinyl acetate copolymer hot melt adhesive and from about 0.01 to about 30 percent by weight, based on the total weight of the adhesive composition, of an aliphatic polyhydroxy compound in which hydroxyl groups are bonded to at least 50 percent of the aliphatic carbon atoms.

47. An adhesive composition in accordance with claim 46 wherein said polyhydroxy compound is glucose.

48. An adhesive composition in accordance with claim 46 wherein said polyhydroxy compound is sorbitol.

49. An adhesive composition in accordance with claim 46 wherein said polyhydroxy compound is mannitol.

50. An adhesive composition in accordance with claim 50 wherein said polyhydroxy compound is polyvinyl alcohol.

51. An adhesive composition in accordance with claim 46 wherein said polyhydroxy compound is pentaerythritol.

52. A method of improving the resistance to cathodic disbondment of an adhesive which comprises incorporating into a hot melt adhesive or a mastic from about 0.01 to about 30 percent by weight, based on the total weight of the adhesive composition, of an aliphatic polyhydroxy compound in which hydroxyl groups are bonded to at least 50 percent of the aliphatic carbon atoms.

53. A method in accordance with claim 32 wherein said adhesive is a hot melt adhesive.

54. A method in accordance with claim 53 wherein said hot melt adhesive is an ethylene-ethyl acrylate copolymer hot melt adhesive.

55. A method in accordance with claim 53 wherein said hot melt adhesive is an ethylene-vinyl acetate copolymer hot melt adhesive.

56. A method in accordance with claim 52 wherein said polyhydroxy compound is glucose.

57. A method in accordance with claim 52 wherein said polyhydroxy compound is sorbitol.

58. A method in accordance with claim 52 wherein said polyhydroxy compound is mannitol.

59. A method in accordance with claim 52 wherein said polyhydroxy compound is polyvinyl alcohol.

60. A method in accordance with claim 52 wherein said polyhydroxy compound is pentaerythritol.

61. A method of protecting a metal substrate from corrosion which comprises impressing an electrical current through said substrate such that said substrate forms a cathode, and bonding to the surface of said substrate a protective coating by means of an adhesive composition comprising an adhesive component and from about 0.01 to about 30 percent by weight, based on the total weight of the adhesive composition, of an aliphatic polyhydroxy compound in which hydroxyl groups are bonded to at least about 50 percent of the aliphatic carbon atoms, said adhesive component being a hot melt adhesive or a mastic.

62. A method in accordance with claim 61 wherein said protective coating is a polymeric material.

63. A method in accordance with claim 62 wherein said polymeric material is polyethylene.

64. A method in accordance with claim 62 wherein said polymeric material is cross-linked polyethylene.

65. A method in accordance with claim 61 wherein said adhesive is a hot melt adhesive.

66. A method in accordance with claim 61 wherein said hot melt adhesive is an ethylene-ethyl acrylate copolymer hot melt adhesive.

67. A method in accordance with claim 61 wherein said hot melt adhesive is an ethylene-vinyl acetate copolymer hot melt adhesive.

68. A method in accordance with claim 61 wherein said polyhydroxy compound is glucose.

69. A method in accordance with claim 61 wherein said polyhydroxy compound is sorbitol.

70. A method in accordance with claim 61 wherein said polyhydroxy compound is mannitol.

71. A method in accordance with claim 61 wherein said polyhydroxy compound is polyvinyl alcohol.

72. A method in accordance with claim 61 wherein said polyhydroxy compound is pentaerythritol.

* * * * *